United States Patent
Konopacki et al.

(10) Patent No.: US 6,955,160 B1
(45) Date of Patent: Oct. 18, 2005

(54) GASEOUS FUEL PRESSURE REGULATOR FOR ELECTRONICALLY CONTROLLING AN OUTLET PRESSURE

(75) Inventors: Jeffery M. Konopacki, Ripon, WI (US); Blake R. Suhre, Neenah, WI (US)

(73) Assignee: Brunswick Corporation, Lake Forest, IL (US)

( * ) Notice: Subject to any disclaimer, the term of this patent is extended or adjusted under 35 U.S.C. 154(b) by 68 days.

(21) Appl. No.: 10/612,485

(22) Filed: Jul. 2, 2003

(51) Int. Cl.[7] ............................................. F02M 21/02
(52) U.S. Cl. ..................................... 123/527; 137/487.5
(58) Field of Search ........................... 123/527, 599; 137/487.5; 48/191

(56) References Cited

U.S. PATENT DOCUMENTS

| | | | | |
|---|---|---|---|---|
| 3,650,254 A | | 3/1972 | McJones ..................... 123/120 |
| 4,112,889 A | | 9/1978 | Harpman ..................... 123/25 |
| 4,413,607 A | | 11/1983 | Batchelor et al. ........... 123/590 |
| 4,497,304 A | | 2/1985 | Wintrell et al. ............. 123/527 |
| 5,251,602 A | | 10/1993 | Kurihara et al. ............ 123/527 |
| 5,337,722 A | | 8/1994 | Kurihara et al. ............ 123/527 |
| 5,367,999 A | * | 11/1994 | King et al. .................. 123/458 |
| 5,551,407 A | | 9/1996 | Greenway .................... 123/527 |
| 5,860,407 A | | 1/1999 | Chapin et al. .............. 123/698 |
| 6,026,787 A | | 2/2000 | Sun et al. .................... 123/525 |
| 6,131,552 A | * | 10/2000 | Paielli et al. ................ 123/527 |
| 2002/0029770 A1 | | 3/2002 | Heffel et al. ................ 123/527 |

* cited by examiner

*Primary Examiner*—Mahmoud Gimie
*Assistant Examiner*—Katrina Harris
(74) *Attorney, Agent, or Firm*—William D. Lanyi (57) ABSTRACT

A gaseous fuel pressure regulator uses an inlet valve and an outlet valve to regulate an incoming pressure, from a gaseous fuel supply tank, and accurately control the pressure at the outlet of the regulator. The control of the outlet pressure is maintained by precise movement of the outlet valve which is controlled by an actuator. The actuator receiving pulse width modulated signals from a microprocessor in order to maintain the outlet valve in an opened, or gas flow permitting, position for a time period which is appropriate to maintain the desired pressure at the outlet port of the regulator. An inlet port maintains a pressure within a conduit, which is connected in fluid communication between the inlet port and the outlet port at an intermediate pressure which is used by the outlet valve to achieve the desired outlet pressure magnitude.

6 Claims, 5 Drawing Sheets

FIG. 6

GASEOUS FUEL PRESSURE REGULATOR FOR ELECTRONICALLY CONTROLLING AN OUTLET PRESSURE

BACKGROUND OF THE INVENTION

1. Field of the Invention

The present invention is generally related to a gas flow regulator and, more particularly, to a gas flow regulator that allows a microprocessor to accurately control the flow of a gas provided at an outlet of the regulator.

2. Description of the Prior Art

Those skilled in the art are familiar with many different types of regulators. When used in conjunction with nitrous oxide or gaseous fuels, such as liquefied petroleum gas (LPG), it is important that the gas is provided to a combustion chamber of an engine at an appropriate flow rate to result in the desired air/fuel ratio.

U.S. patent application Ser. No. 09/925,281, which was filed by Heffel et al. on Aug. 8, 2001, describes an apparatus and method for operating internal combustion engines from variable mixtures of gaseous fuels. The apparatus and method allow arbitrary mixture ratios of multiple fuel gasses having differing combustion characteristics, such as natural gas and hydrogen gas, to be used in an internal combustion engine. The gaseous fuel composition ratio is first sensed, such as by thermal conductivity, infrared signature, sound propagation speed, or equivalent mixture differentiation mechanisms and combinations thereof which are utilized as inputs to a multiple map engine control module which modulates selected operating parameters of the engine, such as fuel injection and ignition timing, in response to the proportions of fuel gases available so that the engine operates correctly and at high efficiency irrespective of the gas mixture ratio being utilized. As a result, an engine configured according to the teachings of this invention may be fueled from at least two different fuel sources without admixing constraints.

U.S. Pat. No. 6,131,552, which issued to Paielli et al. on Oct. 17, 2000, describes a fuel control system for a gas-operated engine. The system relates to the delivery of gaseous fuel from a source through an air/fuel mixture to a gas-operated engine that includes at least one sensor for operative coupling to the engine to provide at least one electronic sensor signal responsive to engine operating conditions. An electronic control unit is responsive to the sensor signals for providing a fuel control signal indicative of a desired quantity of fuel to be delivered to the engine. A pressure regulator, for disposition between the fuel source and the fuel/air mixture, is responsive to the fuel control signal for controlling delivery of gaseous fuel to the mixer. The pressure regulator includes a housing having an inlet for connection to the fuel source and an outlet for connection to the mixer. A valve is disposed within the housing and biased toward closure by a primary pressure regulating spring for controlling flow of fuel from the inlet to the outlet. A solenoid force motor is mounted on the housing and has a force coil for receiving and translating the fuel control signal. A rigid actuating member is driven by and extends from the coil into the housing directly to the valve actuating lever for modulating control of the operative position of the valve in bypass mechanical force transmission relationship to the regulating spring, and thereby modulating control flow of gaseous fuel through the housing, as a function of the fuel control signal to the pressure regulator.

U.S. Pat. No. 6,026,787, which issued to Sun et al. on Feb. 22, 2000, described an air-fuel control for alternative engine fuels. A mixture of gaseous fuel, such as natural gas or propane, and gasoline is used to fuel the internal combustion engine of a motor vehicle. The ratio of gaseous fuel to gasoline is preadjusted by the manual settings of an electronic processor which is used to change the gasoline fuel injection rate and the manual settings of a air/vacuum balance valve connected to a low pressure regulator and mixer are used to regulate the pressure of the gaseous fuel and mix it with air to provide the desired ratio. The fuel injection is also controlled in response to a signal fed to the processor which is in accordance with the output of the vehicle's exhaust oxygen sensors. The flow rate of gaseous fuel to the engine is controlled by means of a mixer which is preadjusted for a desired flow rate. This flow rate is automatically varied in response to the intake manifold pressure of the engine. This manifold pressure drives a valve which controls the gaseous fuel flow rate. When one of the dual fuels is depleted, a control in the electronic processor operates to switch to the other fuel and the vehicle is then operated on a single fuel.

U.S. Pat. No. 5,860,407, which issued to Chapin et al. on Jan. 19, 1999, describes a gaseous fuel control system for engines. It is a system for delivering and regulating fuel and air flows to the engine and an electronically controlled rotary pressure regulator implementing fine adjustments in the pre-mixing pressure of gaseous fuel. Gaseous fuel from a high-pressure fuel tank is forced into a passage and through a series of pressure regulators during combustion. Inside the throttle body, butterfly plates respond to signals from an electronic controller to regulate the flows of air and gaseous fuel. The fuel passes into a stagnation chamber and mixes with air flow through a series of radial mixing orifices in a common wall between the stagnation chamber and the air passageways. The fuel/air ratio is coarsely controlled by the reaction of the butterfly plates to the signals of the electronic controller and is more finely controlled by electronic rotation of the rotary gas pressure regulator.

U.S. Pat. No. 5,551,407, which issued to Greenway on Sep. 3, 1996, describes a fuel-air mixer apparatus and method for gaseous fuel engines. A fuel-air mixer body includes a mixer passage extending therethrough with a fuel release body positioned centrally within the mixer passage. A fuel control section of the mixer passage is defined between the inner wall of the mixer passage and the outer wall of the fuel release body, and includes a flow restricting section and a flow area increasing section. As input air to be mixed with fuel for combustion flows through the mixer passage, a relatively high pressure area is formed in the flow restricting section, a first pressure reduction area is produced in the flow area increasing, and a second pressure reduction area is produced downstream from the fuel release body. Gaseous fuel may be released into the air at two separate locations. The first location is in the flow area increasing section and the second location is at the end of the fuel release body. The method of the invention includes producing the relatively high pressure area within the mixer passage, to separate reduced pressure areas within the passage, and releasing gaseous fuel in the two reduced pressure areas to produce the desired fuel-air mixing.

U.S. Pat. No. 5,337,722, which issued to Kurihara et al. on Aug. 16, 1994, describes a fuel control and feed system for a gas fueled engine. Several embodiments of engines and systems for fueling engines to reduce the emission of unwanted exhaust gas constituents are described. These embodiments also improve the fuel economy of the engine. A catalytic converter is provided in the exhaust system and a gaseous fuel is used at least during starting so as to bring the catalytic converter up to its operating temperature rapidly without necessitating the provision of an enriched fuel/air mixture. An oxygen sensor is employed in the exhaust system and a feedback control system varies the fuel/air ratio of the engine during its running in response to the output of the oxygen sensor. In order to test that the oxygen sensor is at its operating condition before feedback control is initiated, a rich fuel mixture is supplied and this rich fuel mixture is discontinued immediately upon the receipt of a signal from the oxygen sensor indicating that a rich mixture exists. Applications of the principal to both air valve type of carburetors and conventional carburetors are disclosed.

U.S. Pat. No. 5,251,602, which issued to Kurihara et al. on Oct. 12, 1993, describes a fuel supply system for gas-fueled engines. Two embodiments of air/fuel ratio adjusting systems for gaseous fueled internal combustion engines are described. In each embodiment, a pressure regulator supplies regulated fuel in gaseous form from a source in which it is stored in a liquid from to a charge former that has a fuel control device such as a needle valve. The air/fuel ratio is maintained constant by mixing atmospheric air with the fuel before the charge former fuel control device under the control of the oxygen sensor in exhaust system. In one embodiment, an enrichment system is also incorporated for supplying enrichment fuel under acceleration or cold starting conditions.

U.S. Pat. No. 4,497,304, which issued to Wintrell et al on Feb. 5, 1985, describes a fuel and air mixing apparatus. The invention comprises a system for introducing gaseous or vaporized fuels into a carburetor from a storage tank including a regulator connected between the tank and the carburetor for providing a supply of hydrocarbon fuel in a gaseous state at a regulated vapor pressure to a mixing chamber having air and fuel intake ports to blend the hydrocarbon fuel with intake air for injection into the carburetor. In a typical installation, the pressure change of the vacuum manifold alters the pressure within the mixing chamber to draw in fuel and air in proportion to a near constant equivalence ratio, due to the respective areas of the intake ports, over the entire operating range of the engine. U.S. Pat. No. 4,413,607, which issued to Batchelor et al. on Nov. 8, 1983, described a propane carburetion system. The system is used with an existing combustion engine. It provides for enabling the engine to be operated on a liquefied propane, alone, through a conventional gasoline carburetor, to operate on either gasoline or liquefied propane through a conventional gasoline carburetor, to operate on liquefied propane, alone, through an inlet casting to be utilized in lieu of a conventional gasoline carburetor, or to operate on liquefied propane, alone, at a substantially constant engine speed. Further, the system is also operative in conjunction with a diesel engine whereby a small amount of gasified liquid propane may be introduced into the induction system of a diesel engine as a supplemental fuel charge therefore during high power demand periods of operation. The system includes a regulator-vaporizer assembly for reducing the pressure of and thus transferring liquid propane into gasified liquid propane, heating the propane gas and ducting the propane gas to an induction passage mixer, the latter including various adjustment features whereby the proper mixture of induction air and propane is afforded.

U.S. Pat. No. 4,112,889, which issued to Harpman on Sep. 12, 1978, describes a fuel system and vaporizer for internal combustion engines. A fuel system for an internal combustion engine of the piston type vaporizes a liquid fuel and water and mixes the resulting gaseous fuel and water vapor with air in a metering valve which communications with the internal combustion engine. A device operating at a very high temperature is used in the vaporization of the fuel. The high temperature gaseous state of the fuel represents molecules of the greatest degree of separation from each other providing the greatest opportunity for contact of the reacting species in the gaseous condition as chemical reactions occur only between particles at the atomic or molecular level and it is necessary for the reacting special to be in actual contact at the time of reaction. The fuel system therefore enables complete combustion and elimination of the atmospheric pollutants common in the operation of internal combustion engines.

U.S. Pat. No. 3,650,254, which issued to McJones on Mar. 21, 1972, describes a method and apparatus for rapidly changing the air-fuel ration of an internal combustion engine from a lean condition to a rich condition. A regulator in the fuel system of a vehicle's internal combustion engine regulates the fuel pressure of a gaseous fuel, such as natural gas, to a fuel-air mixer. The regulator maintains a predetermined fuel pressure for idle and cruise conditions and increases fuel pressure to effect an enriching of the air-fuel ratio for full throttle conditions. The degree of enriching is sufficient to pass through a region where there is a threat of exhaust valve burning and where the maximum amount of the oxides of nitrogen are produced. The change in air-fuel ration is extremely rapid to avoid operation for any material amount of time in this region. The regulator also effects a change from a rich air-fuel ratio to a lean one at a predetermined point in throttle setting below the point at which enriching occurs. Most currently known gaseous fuel pressure regulators are unable to achieve the accurate regulation of gaseous fuel pressure needed to rapidly control the gaseous fuel pressure during significant load or speed transients. As a result, significant deviations of air/fuel ratios from desired air/fuel ratios can occur. When these deviations occur, they can represent a significant degradation of both emissions and running quality of the engine.

The patents described above are hereby expressly incorporated by reference in the description of the present invention.

SUMMARY OF THE INVENTION

A gas flow regulating system, made in accordance with the present invention, comprises an inlet port, a conduit connected in fluid communication with the inlet port, and an outlet port connected in fluid communication with the conduit. It also comprises an actuator, an inlet valve disposed in fluid communication between the inlet port and the conduit, and an outlet valve disposed between the conduit and the outlet port. The outlet valve is operable to selectively inhibit or permit the gas to flow from the conduit to the outlet port. The outlet valve is moveable to any one of a plurality of positions between a gaseous fuel flow inhibiting position and a gaseous fuel flow permitting position in response to movement of the actuator. The present invention also comprises a controller which can be a microprocessor and which is connected in fluid communication with the actuator. The controller is configured to maintain a desired gas flow rate at the outlet port. The desired gas flow rate is typically determined as a function of a desired air/fuel ratio and a known flow rate of air being used by an engine. The microprocessor can easily calculate the desired gas flow rate as a function of the known air flow rate and desired air/fuel ratio in the applications of the present invention where nitrous oxide is the gas being controlled by the present invention. In the event that a gaseous fuel (e.g. LPG) is the gas being controlled, the microprocessor determines the desired gas flow rate as the function of the operating condition of the engine. The microprocessor is connected in signal communication with the actuator. The microprocessor is configured to provide a signal to the actuator to control the movement of the outlet valve to a position between the gaseous fuel flow inhibiting and the gaseous fuel flow permitting positions.

In a particularly preferred embodiment of the present invention, the signal is a pulse width modulated (PWM) signal comprising a plurality of pulses in which the duty cycle of the pulses is determined to achieve the desired flow rate at the outlet of the regulator.

The regulating system of the present invention can further comprise a pressure sensor disposed in pressure sensing relation with the outlet port. The pressure sensor is connected in signal communication with the microprocessor and the signal from the pressure sensor is a function of a pressure magnitude within the outlet port. The pressure sensor is used to provide a pressure magnitude that is used to calculate the actual gas flow rate through the system. In conjunction with a temperature measurement, the pressure magnitude can be used to calculate the actual gas flow rate at the outlet of the regulator. This type of calculation is well known to those skilled in the art.

In a preferred embodiment of the present invention, the inlet valve is configured to meter a flow of the gaseous fuel from the inlet port of the regulator, at a first pressure magnitude, into the conduit, at a second pressure magnitude, and the outlet valve is configured to meter a rate of flow of the gas from the conduit, at the second pressure, into the outlet port, at a third pressure magnitude. The microprocessor is configured to control the gas flow rate at the outlet by changing the third pressure magnitude. This achieves the desired gas flow rate.

BRIEF DESCRIPTION OF THE DRAWINGS

The present invention will be more fully and completely understood from a reading of the description of the preferred embodiment in conjunction with the drawings, in which.

DESCRIPTION OF THE PREFERRED EMBODIMENT

Throughout the description of the preferred embodiment of the present invention, like components will be identified by like reference numerals.

Figure 1:
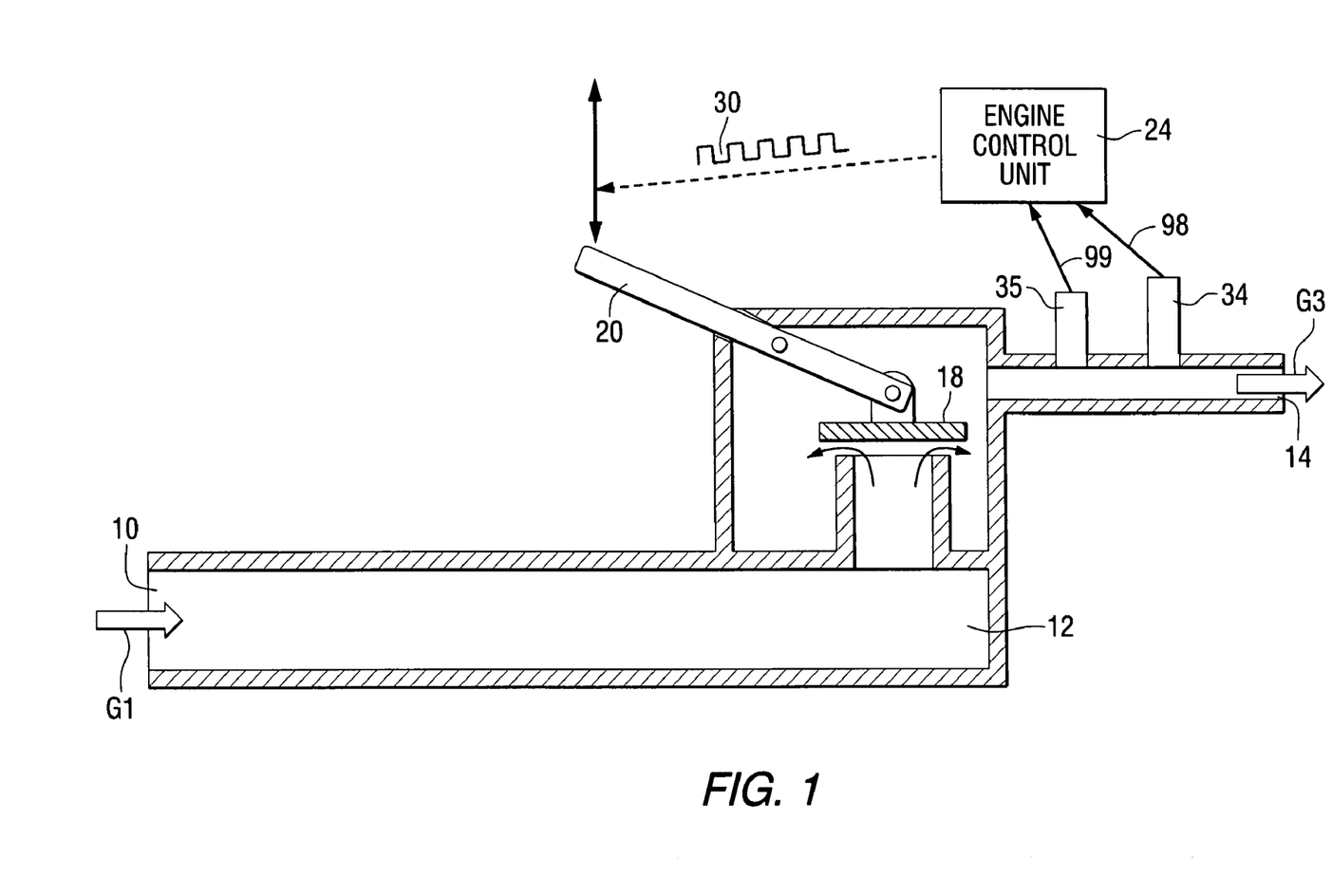
FIG. 1 is a highly simplified representation of one application of the principals of the present invention.

FIG. 1 is a highly simplified representation of a gas flow regulator operating under the basic principles of the present invention. An inlet port 10 is connectable to a supply of a gas, such as nitrous oxide or gaseous fuel, from a storage tank. A conduit 12 is connected in fluid communication with the inlet port 10. An outlet port 14 is connected in fluid communication with the conduit 12. An outlet valve 18 is disposed between the conduit 12 and the outlet 14. The outlet valve 18 is operable to selectively inhibit, permit, or partially permit the flow of a gas from the conduit 12 to the outlet port 14. The outlet valve 18 is moveable to any one of a plurality of positions between a gaseous fuel flow inhibiting position and a gaseous fuel flow permitting position in response to movement of an actuator 20. In FIG. 1, the outlet valve 18 is shown in a gas flow permitting position. As a result, a gas is allowed to flow from the conduit 12 toward the outlet port 14. A microprocessor 24, such as an engine control unit, is connected in signal communication with the actuator 20 and the microprocessor is configured to maintain a desired flow rate at the outlet port 14.

In FIG. 1, arrow G1 represents the flow of the gas at a pressure magnitude determined by the pressure in a gaseous fuel storage tank, or an intermediate pressure regulator, and arrow G3 represents the flow of the gas at a desired flow rate, as determined by the PWM signals 30 provided by the engine control unit 24. In FIG. 1, a pressure sensor 34 is connected in signal communication with the microprocessor of the engine control unit 24 to allow the engine control unit to monitor the outlet port pressure and control the actuator 20 accordingly. A temperature sensor 35 is also used to provide a signal, on line 99, to the engine control unit 24. By knowing the pressure and the temperature near the outlet port 14, the microprocessor of the engine control unit 24 can calculate the gas flow rate through the outlet port 14 according to basic principles that are well known to those skilled in the art.

Figure 2:
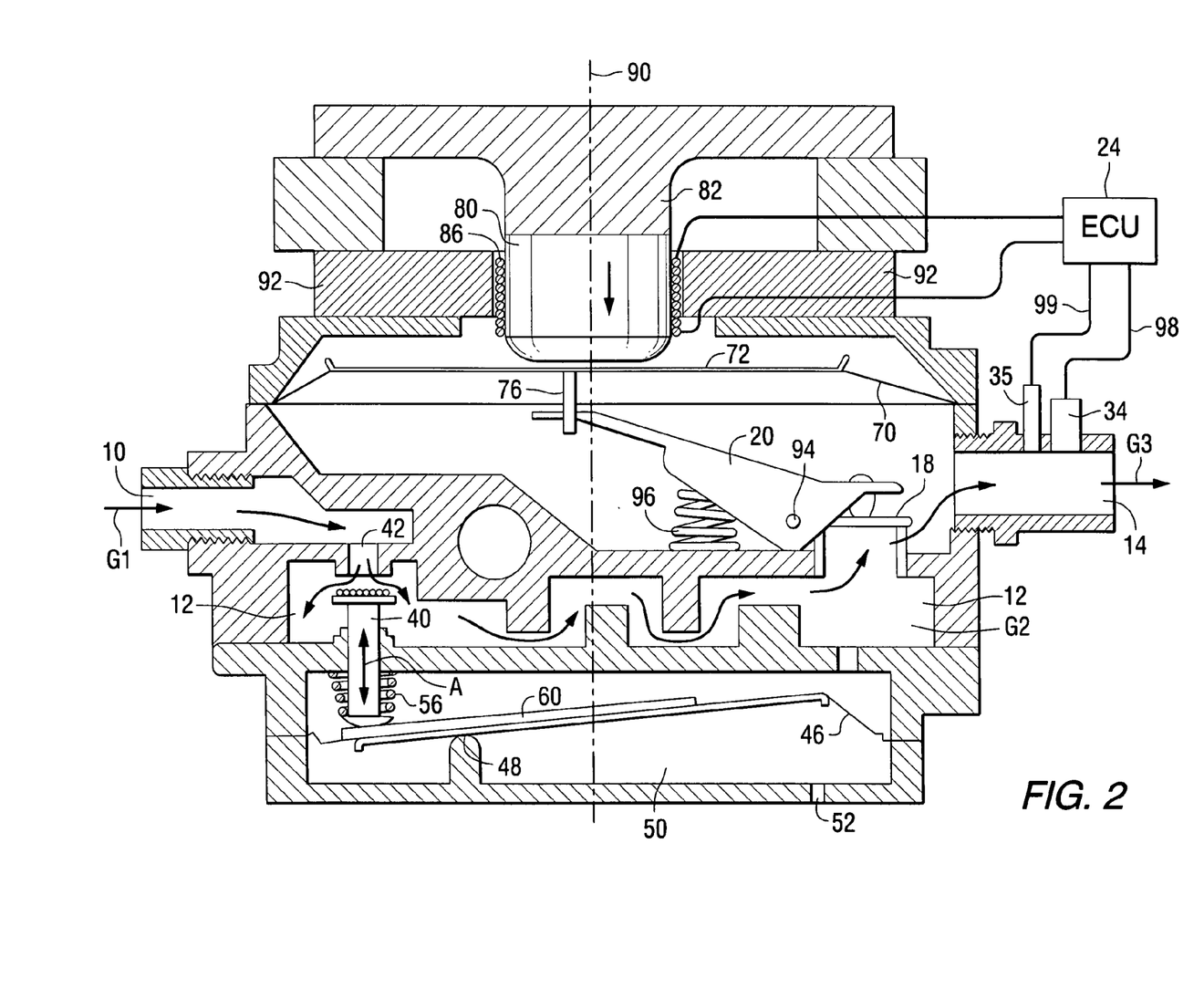
FIG. 2 is a section view of a preferred embodiment of the present invention.

It should be understood that FIG. 1 is a highly simplified schematic representation of the basic implementation of the present invention. FIG. 2 shows a more complex preferred embodiment of the present invention.

In FIG. 2, a gas flows into the inlet port 10, as represented by arrow G1, and proceeds to flow through a conduit 12 which is connected in fluid communication with the inlet port 10. An inlet valve 40 is moveable, as indicated by arrow A, so that it can open or close a passage 42 between the inlet port 10 and the conduit 12. It operates as the intermediate pressure regulator referred to above. Operation of the inlet valve 40 is controlled by the movement of a diaphragm 46 about a pivot point 48 which causes the inlet valve 40 to move up or down, depending on the relative pressure magnitude within the conduit 12 and the pressure magnitude within cavity 50, which is exposed to atmospheric pressure by passage 52. A spring 56 is provided to control the pressure in the conduit 12 to a second pressure magnitude G2 within the conduit 12. By sequentially opening and closing, in response to changes in pressure within conduit 12, the inlet valve 40 regulates the pressure within the conduit 12 to a magnitude that is approximately equal to, but slightly higher than, the output pressure G3 at the outlet port 14 which would be expected to result in a desired gas flow rate at the outlet port 14. However, since the action of the inlet valve 40 is controlled mechanically by the relative forces provided by spring 56 and the lever 60 attached to diaphragm 46, the accuracy of the regulation of the pressure within conduit 12 is not sufficiently accurate for some applications.

With continued reference to FIG. 2, the actuator system of the present invention comprises the actuator arm 20, a diaphragm 70, and a plate 72. The plate 72 is attached to the actuator arm 20 by rod 76. The actuator system of the present invention further comprises a moveable component 80, such as a cup, which is disposed about a protrusion 82 of a fixed yoke member. A winding 86 is wound around the cup 80 and connected electrically to the microprocessor of the engine control unit 24. By providing a pulse width modulated (PWM) signal to the coil 86, the cup 80 can be caused to move in a direction parallel to centerline 90 to a chosen position. A permanent magnet 92 acts cooperatively with the magnetic field generated by the coil 86 and induces movement along a path which is parallel to axis 90. Movement of the cup 80 causes the plate 72 to move, to a desired position, in a direction generally parallel to axis 90. This, in turn, causes the actuator lever 20 to pivot about point 94 to move the outlet valve 18 to a position between a gas flow inhibiting position, as illustrated in FIG. 2, and a gas flow permitting position, as shown in FIG. 1. The actuator lever 20 is urged into a position, by spring 96, which urges the outlet valve into its gas flow inhibiting position. Downward movement of the cup 80 pushes against plate 72 and, through the connection by rod 76, the actuator lever 20 is pivoted in a counterclockwise direction about pivot 94 to move the outlet valve 18 into its gas flow permitting position.

It should be understood that in a normal operation of the present invention, the pressure G2 within conduit 12 is less than the inlet pressure G1 provided by the gaseous fuel supply tank. In addition, the desired pressure magnitude at the outlet port 14 is generally less than the pressure G2 within the conduit 12. The pressure sensor 34 provides signals, on line 98, that allow the engine control unit 24 to monitor the pressure at the outlet port 14. The engine control unit 24 then provides the pulse width modulated signal (PWM) 30, as described above in conjunction with FIG. 1, which causes the cup 80 to move downward against plate 72 to a position determined by the duty cycle of the pulse width modulated (PMW) signal. Therefore, by increasing the duty cycle of the pulse width modulated signal provided to the coil 86, pressure and flow rate at the outlet port 14 can be increased by maintaining the outlet valve 18 in its greater flow permitting position. The use of the pulse width modulated signal to control the actuator system allows the present invention to accurately control the pressure magnitude and flow rate G3 at the outlet port 14.

Figure 3:
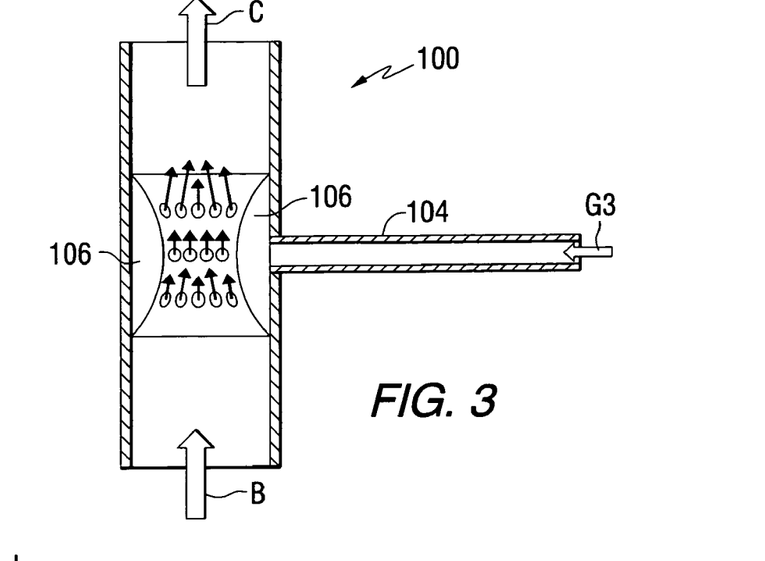
FIG. 3 shows a mixer that can be used in conjunction with the present invention.

In order to more specifically describe one type of application of the present invention, relating to the regulation of gaseous fuel, FIG. 3 shows a mixer 100 that mixes gaseous fuel with air. The mixer receives gaseous fuel (e.g LPG), at a pressure and flow rate G3, through conduit 104. The gaseous fuel flows into an annular cavity 106 that surrounds a plurality of holes that allows the gaseous fuel to flow into a stream of air represented by arrow B. This mixes the gaseous fuel with the air to form an air/fuel ratio that is determined by the relative flow rates of air and gaseous fuel. The mixture of air and gaseous fuel then continues to flow away from the mixing region, as represented by arrow C in FIG. 3. Although FIG. 3 shows one possible type of mixer that can be used in conjunction with the present invention, it should be understood that other types of mixers and carburetors can also be used in conjunction with the present invention.

Figure 4:
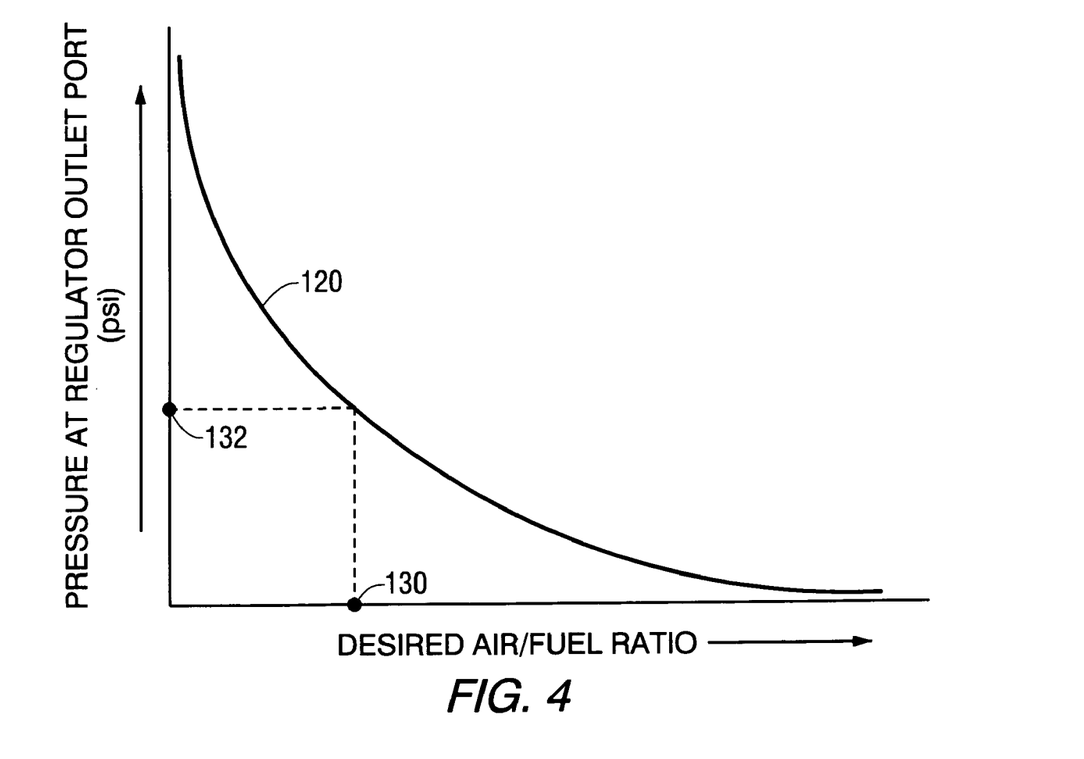
FIG. 4 is a graphical representation showing that a relationship between a desired air/fuel ratio and the pressure at the outlet of the regulator exists.

FIG. 4 is a graphical representation showing a line 120 that represents a relationship between desired air/fuel ratio provided to an internal combustion engine and the pressure G3, and hence the flow rate, at the regulator output port 14. It should be understood that the shape of the line 120 shown in FIG. 4 may vary, depending on the physical geometry of the internal combustion system and the mixer 100 used in conjunction with the present invention. However, the graphical representation in FIG. 4 is intended to show that a relationship exists between the desired air/fuel ratio and the pressure of the supplied gaseous fuel. In other words, if a particular desired air/fuel ratio, such as that represented by point 130, is desired, a suitable outlet port pressure 132 can be selected and provided by the present invention. It should be clearly understood that setting a particular outlet port pressure 132, in itself, is not a primary goal of the present invention. The goal is to achieve a desired flow rate of gas through the outlet port of the regulator. The measured pressure at the outlet is used, in conjunction with a temperature measurement, to calculate an actual rate of flow of the gas passing through the outlet port. The position of the outlet valve 18 is selected by the engine control unit 24 to achieve a desired gas flow. The position of the outlet valve is selected as a function of the desired flow rate of gas at the outlet port. Movement of the outlet valve, by its nature, changes the pressure at the outlet port. However, in most applications of the present invention, the ultimate goal is to achieve a desired flow rate and not a desired pressure. Although a pressure is important and is associated with the desired gas flow rate, changes in temperature can also result in a change in the relationship between the pressure at the outlet port and the gas flow rate through the outlet port.

Figure 5:
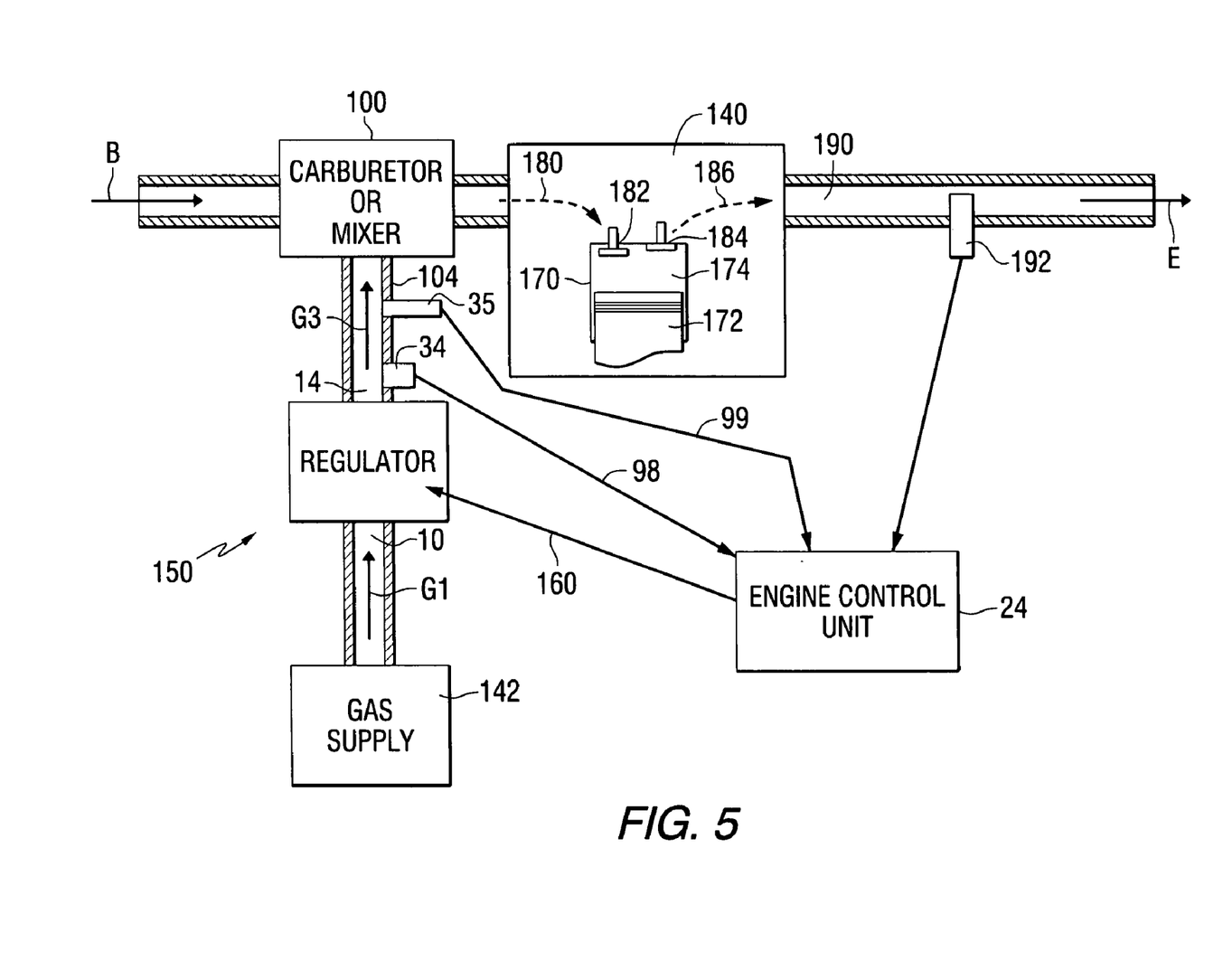
FIG. 5 shows a system in which the present invention is used in conjunction with a carburetor or mixer to provide a flow of gaseous fuel at a preselected air/fuel ratio to an internal combustion engine.

FIG. 5 shows a system in which the present invention is used in conjunction with an internal combustion engine 140 and a carburetor or mixer 100. Air or a gaseous fuel flows, as represented by arrow B, through the carburetor or mixer 100 on its way to the engine 140. A gas, such as nitrous oxide or a gaseous fuel, such as LPG, is provided by a gas supply 142. The regulator 150 maintains an outlet port pressure magnitude G3 which is conducted to the carburetor or mixer 100 through conduit 104. The engine control unit 24 monitors the outlet pressure magnitude G3 and provides pulse width modulated signals, as represented by arrow 160, to the regulator 150.

With continued reference to FIG. 5, the engine 140 is shown as comprising a cylinder 170, a piston 172, and a combustion chamber 174 in which the gaseous fuel mixture is ignited. It should be understood that the cylinder 170, piston 172, and combustion chamber 174 are illustrated in a highly schematic manner in FIG. 5, but they show the relative relationships between the carburetor or mixer 100 and the flow of the gas. The gas flows from the carburetor or mixer 100, as illustrated by dashed line arrow 180, to an inlet 182 of the cylinder 170. After combustion of the gaseous fuel in the combustion chamber 174, exhaust gas flows from the exhaust port 184, as represented by dashed line arrow 186, to an exhaust conduit 190. Although not necessary in all applications of the present invention, the engine control unit 24 can use an oxygen sensor 192 to determine the magnitude of oxygen in the exhaust. The exhaust gas, represented by arrow E, can flow to a catalytic converter. In applications where a catalytic converter is used, it is important to determine the oxygen content of the exhaust gas in order to determine the appropriate air/fuel ratio to be provided to the cylinders 170 of the engine 140. The present invention allow the engine control unit 24 to control the outlet port flow rate G3 so that the amount of gaseous fuel provided to the carburetor or mixer 100 is appropriate to result in an air/fuel ratio that meets the requirements of the oxygen content in the exhaust conduit 190.

Figure 6:
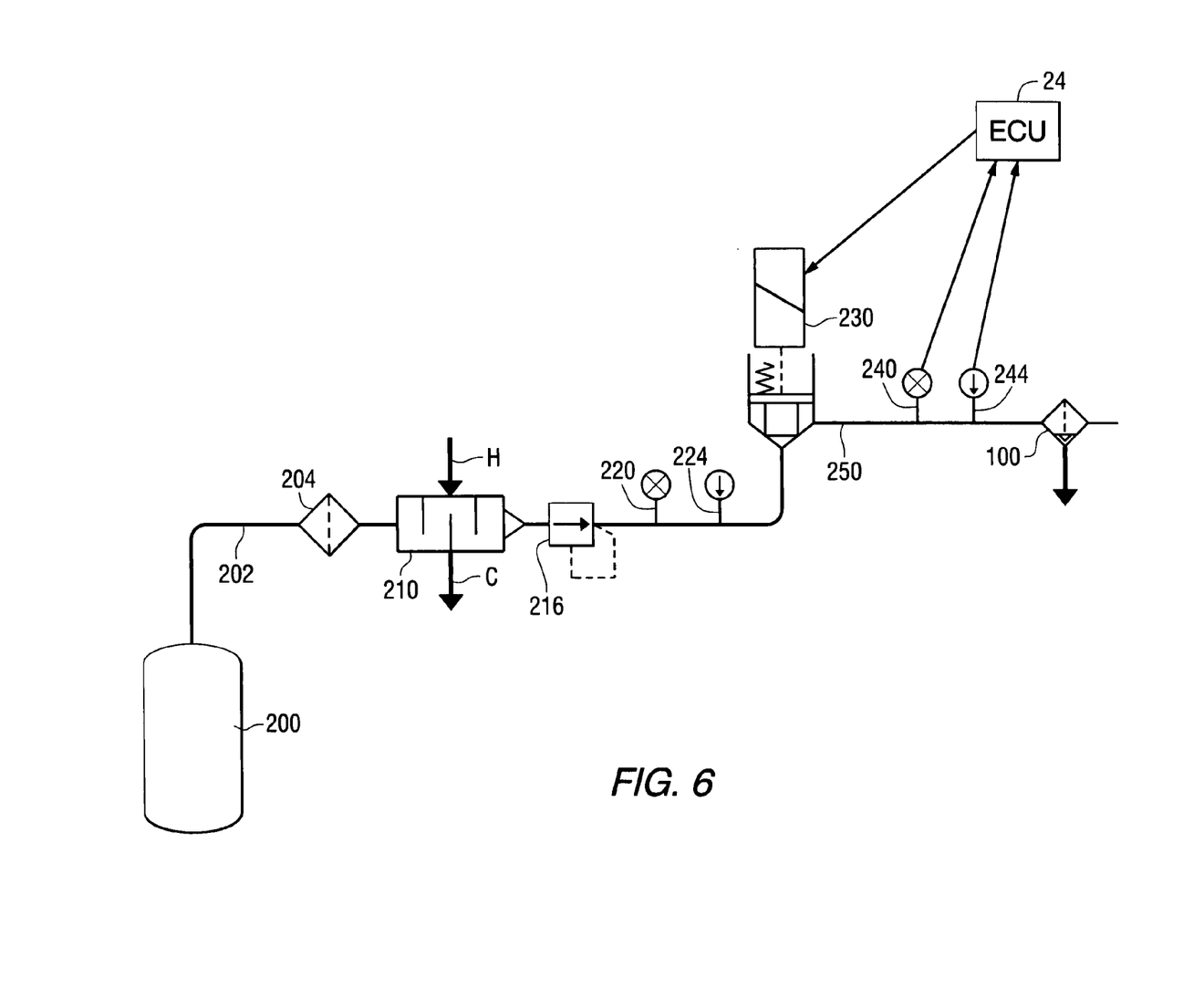
FIG. 6 is a schematic representation of the present invention in conjunction with an LPG supply system.

FIG. 6 is a simplified schematic diagram showing an arrangement in which the present invention is used to regulate the flow of a gaseous fuel, such as liquefied petroleum gas. The liquefied petroleum gas (LPG) is stored in a fuel tank 200. The liquefied petroleum gas passes through conduit 202, through a filter 204, and through a liquid-to-gaseous phase changing device 210. Hot water can be passed, as indicated by arrow H, through the heat exchanging mechanism 210 and flow out of the mechanism, as represented by arrow C, as cool water. The hot water gives up its heat to the liquefied petroleum gas in order to vaporize it. A pressure reducing stage 216, such as the mechanism described above in conjunction with FIG. 2 relating to the inlet valve 40, the passage 42, and the operation of the lever 60. A pressure transducer 220 and a temperature transducer 224 are provided upstream from a linear poppet valve 230. The linear poppet valve 230 can be positioned at any one of a plurality of positions that restrict the flow of gas through the poppet valve. The plurality of potential positions of the poppet valve are between a fully opened position and a fully closed position. Another pressure transducer 240 and temperature sensor 244 are provided at the outlet conduit 250 in order to allow the microprocessor, which is described above, to determine the flow rate of gas through conduit 250. This allows the microprocessor to move the linear poppet valve to a position that is determined as a function of the actual flow through conduit 250 and the desired flow through conduit 250. This gas is then conducted to the gaseous fuel/air mixer 100, such as described above in conjunction with FIG. 5.

Although FIG. 6 illustrates the application of the present invention in conjunction with the flow of liquefied petroleum gas (LPG), it should be understood that it can be used with other gases which are not gaseous fuels. In other words, it can be used to regulate the flow of nitrous oxide or other gases.

With reference to FIGS. 1–6, it can be seen that a preferred embodiment of the present invention provides a gas flow regulating system that comprises an inlet port 10, a conduit 12 connected in fluid communication with the inlet port 10, and an outlet port 14 connected in fluid communication with the conduit 12. It also comprises an actuator, which comprises the actuator arm 20, the cup 80, the plate 72, the rod 76, and the diaphragm 70. An inlet valve 40 is disposed in fluid communication between the inlet port 10 and the conduit 12. An outlet valve 18 is disposed between the conduit 12 and the outlet port 14. The outlet valve 18 is operable to selectively inhibit or permit the flow of gaseous fuel from the conduit 12 to the outlet port 14. The outlet valve 18 is moveable to a position between a gaseous fuel flow inhibiting position, as shown in FIG. 2, and a gaseous fuel flow permitting position, as shown in FIG. 1. A microprocessor 24 is connected in signal communication with the actuator system and is configured to maintain a desired flow rate G3 at the outlet port 14. The microprocessor is connected in signal communication with the actuator system and is configured to provide a signal 30, which can be a pulse width modulated (PWM) signal, to the actuator system to control the movement of the outlet valve 18 to a selected position between the gaseous fuel flow inhibiting and gaseous fuel flow permitting position. The signal 30 is a pulse width modulated (PWM) signal that comprises a plurality of pulses defined by a duty cycle selected by the microprocessor 24 to result in the proper position of the outlet valve 18 in order to achieve the desired flow rate G3. A pressure sensor 34 is disposed in pressure sensing relation in the outlet port 14. The pressure sensor 34 and a temperature sensor 35 are connected in signal communication with the microprocessor 24. The signal 30 is the function of a desired flow rate G3 within the outlet port 14. The inlet valve 40 is configured to meter a flow of the gaseous fuel from the inlet port 10 at a first pressure magnitude G1 into the conduit 12 at a second pressure magnitude G2. The outlet valve 18 is configured to meter a flow of gaseous fuel from the conduit 12 at the desired flow rate through the outlet port 14 at a third pressure magnitude. The microprocessor 24 is configured to maintain the gas flow rate magnitude generally equal to a desired flow rate that can be determined as a result of signals received from an oxygen sensor 192, the pressure sensor 34, and the temperature sensor 35.

Although the present invention has been described in particular detail and illustrated to show a preferred embodiment, it should be understood that alternative embodiments are also within its scope.

We claim:

1. A gaseous fuel pressure regulating system, comprising:
an inlet port;
a conduit connected in fluid communication with said inlet port;
an outlet port connected in fluid communication with said conduit;
an actuator;
a first valve disposed between said conduit and said outlet port, said first valve being operable to selectively inhibit or permit gaseous fuel to flow from said conduit to said outlet port, said first valve being movable between a gaseous fuel flow inhibiting position and a gaseous fuel flow permitting position in response to movement of said actuator;
a controller connected in signal communication with said actuator, said controller being configured to maintain a desired pressure magnitude at said outlet port, said controller being a microprocessor which is connected in signal communication with said actuator, said microprocessor being configured to provide a signal to said actuator to control the movement of said first valve between said gaseous fuel flow inhibiting and said gaseous fuel flow permitting positions;
a pressure sensor disposed in pressure sensing relation with said outlet port, said pressure sensor being connected in signal communication with said microprocessor; and
a second valve disposed in fluid communication between said inlet port and said conduit.

2. The regulating system of claim 1, wherein:
said signal is a pulse width modulated signal comprising a plurality of pulses.

3. The regulating system of claim 1, wherein:
said signal is a function of a pressure magnitude within said outlet port.

4. The regulating system of claim 1, wherein:
said second valve is configured to meter a flow of said gaseous fuel from said inlet port at a first pressure magnitude into said conduit at a second pressure magnitude.

5. The regulating system of claim 4, wherein:
said first valve is configured to meter a flow of said gaseous fuel from said conduit at said second pressure magnitude into said outlet port at a third pressure magnitude.

6. The regulating system of claim 5, wherein:
said controller is configured to maintain said third pressure magnitude generally equal to said desired pressure magnitude.

* * * * *